UNITED STATES PATENT OFFICE.

JOHN MARSHALL, OF SWARTHMORE, PENNSYLVANIA, ASSIGNOR TO E. I. DU PONT DE NEMOURS & COMPANY, OF WILMINGTON, DELAWARE, A CORPORATION OF DELAWARE.

PROCESS OF PREPARING DINITRODIPHENYLAMIN.

1,309,580.  Specification of Letters Patent.  Patented July 8, 1919.

No Drawing.  Application filed October 18, 1918.  Serial No. 258,698.

*To all whom it may concern:*

Be it known that I, JOHN MARSHALL, of Swarthmore, in the county of Delaware, and in the State of Pennsylvania, have invented a certain new and useful Improvement in Processes of Preparing Dinitrodiphenylamin, and do hereby declare that the following is a full, clear, and exact description thereof.

My invention relates particularly to a process of preparing dinitrodiphenylamin in an advantageous manner.

Hitherto, in preparing dinitrodiphenylamin, it has been customary to add two molecular proportions of anilin to one molecular proportion of dinitrochlorbenzol, and then to heat the mixture slightly until the reaction begins, thus forming a mixture of dinitrodiphenylamin and anilin hydrochlorid. This reaction, however, caused a considerable evolution of heat so that it was necessary to check the reaction by cooling as by drowning in water. In this way a hard mass was obtained which it was necessary to grind and extract with water in order to dissolve out the anilin hydrochlorid.

The object of my invention is to provide an improved process of obtaining dinitrodiphenylamin by means of which the temperature is readily controlled and the dinitrodiphenylamin is obtained in the form of finely divided crystalline particles which makes the anilin hydrochlorid readily removable.

While my invention is capable of being carried out in many different ways, for the purpose of illustration I shall describe only one way of carrying out the same hereinafter.

I found that if an emulsion of anilin and dinitrochlorbenzol is made by rapid agitation with a solvent of anilin hydrochlorid, which may or may not dissolve one of the raw materials used, but which should dissolve but little of the dinitrodiphenylamin formed, and heating the emulsion thus obtained to a temperature at which the reaction begins, the heat of the reaction is controlled by the resulting evaporation of the solvent and, furthermore, the dinitrodiphenylamin is precipitated in crystalline particles which can be readily washed to remove the major portion of the anilin hydrochlorid.

For example—I may add one part by weight of molten dinitrochlorbenzol to one part by weight of anilin previously warmed to a temperature of 35 to 40° C., thus obtaining a solution. The fluid thus obtained is then added with vigorous agitation to six parts by weight of water heated to about 60° C. The constituents are now agitated until a finely divided emulsion is obtained and live steam is thereupon introduced to bring up the temperature to 80° C., at which point the reaction begins. The agitation is continued until the reaction is completed which requires from one half to one hour, and the agitation is continued for a further period of one half to one hour to secure complete solution of the available anilin hydrochlorid in the water. In this manner red needles of dinitrodiphenylamin are obtained freed from the major portion of the anilin hydrochlorid, and the solution of the latter is removed by filtration or centrifuging and the dinitrodiphenylamin finally purified by washing with sufficient hot water to remove the remaining anilin hydrochlorid. In this way a product is obtained which is available for drying, as for example, in an oven at 80° C., without the necessity of any further grinding or washing.

While I have described my invention in detail, I wish it to be understood that many changes may be made therein without departing from the spirit of the same. For example—the above proportions and temperatures may be varied to a considerable degree.

I claim:—

1. The process which comprises forming dinitrodiphenylamin by emulsifying anilin and dinitrochlorbenzol in a liquid and raising the temperature to the point at which the reaction begins.

2. The process which comprises forming dinitrodiphenylamin by emulsifying anilin and dinitrochlorbenzol in a liquid which is a solvent of the anilin hydrochlorid produced, and raising the temperature to the point at which the reaction begins.

3. The process which comprises forming dinitrodiphenylamin by emulsifying anilin and dinitrochlorbenzol in a liquid which is a solvent of the anilin hydrochlorid but not a solvent of the dinitrodiphenylamin produced, and raising the temperature to the point at which the reaction begins.

4. The process which comprises forming dinitrodiphenylamin by emulsifying anilin and dinitrochlorbenzol in water and raising the temperature to the point at which the reaction begins.

5. The process which comprises forming dinitrodiphenylamin by emulsifying anilin and dinitrochlorbenzol in a liquid, raising the temperature to the point at which the reaction begins, then separating the dinitrodiphenylamin from the liquid and washing the dinitrodiphenylamin thus obtained.

6. The process which comprises forming dinitrodiphenylamin by emulsifying anilin and dinitrochlorbenzol in a liquid which is a solvent of the anilin hydrochlorid produced, raising the temperature to the point at which the reaction begins, then separating the dinitrodiphenylamin from the liquid and washing the dinitrodiphenylamin thus obtained.

7. The process which comprises forming dinitrodiphenylamin by emulsifying anilin and dinitrochlorbenzol in a liquid which is a solvent of the anilin hydrochlorid but not a solvent of the dinitrodiphenylamin produced, raising the temperature to the point at which the reaction begins, then separating the dinitrodiphenylamin from the liquid and washing the dinitrodiphenylamin thus obtained.

8. The process which comprises forming dinitrodiphenylamin by emulsifying anilin and dinitrochlorbenzol in water, raising the temperature to the point at which the reaction begins, then separating the dinitrodiphenylamin from the water and washing the dinitrodiphenylamin thus obtained.

9. The process which comprises forming dinitrodiphenylamin by emulsifying anilin and dinitrochlorbenzol in a liquid and raising the temperature to the point at which the reaction begins, the anilin, dinitrochlorbenzol and the liquid being warm before mixing the same together.

10. The process which comprises forming dinitrodiphenylamin by emulsifying anilin and dinitrochlorbenzol in a liquid which is a solvent of the anilin hydrochlorid produced, and raising the temperature to the point at which the reaction begins, the anilin, dinitrochlorbenzol and the liquid being warm before mixing the same together.

11. The process which comprises forming dinitrodiphenylamin by emulsifying anilin and dinitrochlorbenzol in a liquid which is a solvent of the anilin hydrochlorid but not a solvent of the dinitrodiphenylamin produced, and raising the temperature to the point at which the reaction begins, the anilin, dinitrochlorbenzol and the liquid being warm before mixing the same together.

12. The process which comprises forming dinitrodiphenylamin by emulsifying anilin and dinitrochlorbenzol in water and raising the temperature to the point at which the reaction begins, the anilin, dinitrochlorbenzol and the water being warm before mixing the same together.

13. The process which comprises forming dinitrodiphenylamin by emulsifying anilin and dinitrochlorbenzol in a liquid, raising the temperature to the point at which the reaction begins, then separating the dinitrodiphenylamin from the liquid and washing the dinitrodiphenylamin thus obtained, the anilin, dinitrochlorbenzol and the liquid being warm before mixing the same together.

14. The process which comprises forming dinitrodiphenylamin by emulsifying anilin and dinitrochlorbenzol in a liquid which is a solvent of the anilin hydrochlorid produced, raising the temperature to the point at which the reaction begins, then separating the dinitrodiphenylamin from the liquid and washing the dinitrodiphenylamin thus obtained, the anilin, dinitrochlorbenzol and the liquid being warm before mixing the same together.

15. The process which comprises forming dinitrodiphenylamin by emulsifying anilin and dinitrochlorbenzol in a liquid which is a solvent of the anilin hydrochlorid but not a solvent of the dinitrodiphenylamin produced, raising the temperature to the point at which the reaction begins, then separating the dinitrodiphenylamin from the liquid and washing the dinitrodiphenylamin thus obtained, the anilin, dinitrochlorbenzol and the liquid being warm before mixing the same together.

16. The process which comprises forming dinitrodiphenylamin by emulsifying anilin and dinitrochlorbenzol in water, raising the temperature to the point at which the reaction begins, then separating the dinitrodiphenylamin from the water and washing the dinitrodiphenylamin thus obtained, the anilin, dinitrochlorbenzol and the water being warm before mixing the same together.

In testimony that I claim the foregoing I have hereunto set my hand.

JOHN MARSHALL.

Witnesses:
W. L. LINDSAY,
H. D. MACFADEN.